United States Patent [19]

Rudolph

[11] Patent Number: 4,756,760
[45] Date of Patent: Jul. 12, 1988

[54] DRYING OIL SOAP FOR INTAGLIO INKS

[75] Inventor: Arthur Rudolph, Allendale, N.J.

[73] Assignee: BASF Corporation, Clifton, N.J.

[21] Appl. No.: 907,544

[22] Filed: Sep. 15, 1986

[51] Int. Cl.$^4$ ............................................. C09D 11/06
[52] U.S. Cl. ....................................... 106/27; 106/28; 106/244
[58] Field of Search ............................ 106/27, 28, 244

[56] References Cited

U.S. PATENT DOCUMENTS

| | | | |
|---|---|---|---|
| 1,990,193 | 2/1935 | Lohmann | 134/28 |
| 4,066,585 | 1/1978 | Schepp et al. | 106/27 |
| 4,584,126 | 4/1986 | Joshi | 252/108 |

*Primary Examiner*—Amelia Burgess Yarbrough
*Attorney, Agent, or Firm*—Emil Richard Skula

[57] ABSTRACT

A drying oil soap for water-wipe intaglio inks is disclosed. The drying oil soap comprises the combination of a metal hydroxide, a drying oil, and a hydroxy amine reacted to produce a drying oil soap. The water wipe intaglio printing inks containing the drying oil soaps of the present invention have improved wipeability and produce printed substrates having excellent flexibility and resistance to water, while minimizing or eliminating volatile organic solvents in the inks.

5 Claims, No Drawings

4,756,760

DRYING OIL SOAP FOR INTAGLIO INKS

DESCRIPTION

1. Technical Field

The field of art to which this invention pertains is printing inks, and, more specifically, drying oil soap vehicles for intaglio printing inks.

2. Background Art

Intaglio inks and methods of intaglio printing utilizing these inks are well known in the art.

Intaglio printing typically refers to a method of printing on a substrate using a plate wherein the plate contains sunken areas which carry ink that is transferred to the surface of the substrate thereby forming the printed image. The plates may be engraved by machine, by hand or may be etched through a chemical process. The intaglio printing process may take the form of a sheet fed process using engraved plates or it may be a high speed roto press operation using curved etched plates as in the publication of periodicals and catalogs.

Currency is typically printed in an intaglio process using curved intaglio plates on rotary presses. Currency includes bank notes, stamps, certificates, fine line documents and similar printed substrates. The images are primarily line images and the inks used to print currency are of high viscosity. In a typical intaglio printing process, a plate containing the sunken image areas is inked by a high pressure roller system which presses ink into the engravings, etchings, cavities, etc. Next the excess ink is wiped from the flat or planar areas of the plate surrounding the various indentations, cavities, etchings, engravings, etc., by a wiper system. One wiping system comprises a clean vinyl roller which contacts the plate and wipes away the excess ink on the non-image areas of the plate in a continuous manner. The vinyl roller is then brushed with an aqueous cleaning solution to remove the ink and then dried prior to re-contacting the intaglio plate. This process is generally called "water-wipe" intaglio printing.

Another method of wiping intaglio plates comprises using disposable fibrous material to remove the excess ink from the non-image areas of the plate. This results in massive quantities of ink impregnated waste to dispose of representing potential environmental hazards. Yet another method of removing ink is the use of a doctor blade to scrape ink from the non-image areas of the intaglio plate. The doctor blade system is used in publication gravure processes. Optionally, the plate is inked and wiped several times in succession.

Next the inked and wiped plate is brought into contact under high pressure with a substrate and the ink is transferred from the image areas of the plate to the substrate. Then the plate is again inked, surface wiped and printed in a continuous manner. The printed substrate is removed from the press and dried.

Intaglio inks conventionally used in the art for printing currency are typically high solvent content inks containing solvents such as aromatic hydrocarbons, normal paraffins, isoparaffins, and cycloparaffins. The use of these solvent based inks in an intaglio printing process results in currency which has a striking appearance, and, the printed image is resistant to flexing and to water. However, fibrous wiping systems must be used to wipe intaglio plates.

As previously mentioned, the used, fibrous wiping materials represent environmentally hazardous waste which must be handled and disposed of in an appropriate manner. In addition, the conventional high solvent content inks are known to result in unacceptably high levels of organic solvent vapors being discharged to the environment.

There is a continual search in this art for printing inks which have good printing characteristics and produce a satisfactory printed substrate but which reduce or eliminate hydrocarbon solvents and hazardous waste which is generated as a result of using these inks. It is particularly preferred to eliminate or minimize hazardous waste generated from the intaglio printing process by using intaglio inks which are known as "water-wipe" inks. However, there are numerous problems associated with the use of water-wipe intaglio printing inks including variations in drying rate and printing characteristics and, more specifically, the fact that water-wipe printing inks tend to have poor resistance to water when printed upon a substrate and dried. In addition, water wipe printing inks typically have a high organic solvent content, typically about 15.0 wt. % to about 35.0 wt. %.

Accordingly, what is needed in this art are water wipe printing inks having a low organic solvent content useful in an intaglio printing process which have, when printed upon a substrate and dried, good flexibility, good appearance and excellent resistance to water.

DISCLOSURE OF THE INVENTION

A drying oil soap is disclosed. The drying oil soap comprises the combination of about 0.2 wt. % to about 4.0 wt. % of metal hydroxide, about 5.0 wt. % to about 40.0 wt. % hydroxyamine and about 56 wt. % to about 95 wt. % of drying oil reacted to produce a drying oil soap. The drying oil soap when incorporated as a vehicle into a water wipe intaglio printing ink produces printed images having good water resistance and flexibility, and eliminates or minimizes the need for volatile organic solvents in the intaglio inks.

Another aspect of this invention is a water wipe printing ink for use in intaglio printing. The printing ink comprises about 10.0 wt. % to about 80.0 wt. % of pigment, about 0.0 wt. % to about 5.0 wt. % of a drier, and about 5.0 wt. % to about 50.0 wt. % of a drying oil soap comprising the combination of a metal hydroxide, a hydroxyamine and a drying oil reacted to produce a drying oil soap. The ink when used in an intaglio printing process has improved water wiping and produces printed substrates having improved flexibility and resistance to water and eliminates or minimizes the need for volatile organic solvents in the ink.

Yet another aspect of the present invention is an improved method of intaglio printing wherein a water wipe printing ink is transferred from an ink roll to an intaglio plate, the plate is wiped to remove residual ink from the non-image areas of the plate, the plate is then placed in contact with the substrate under pressure and the ink from the image areas of the intaglio plate is transferred to the substrate thereby forming a printed image, wherein the printing ink composition comprises about 0.0 wt. % to about 5.0 wt. % drier, and about 5.0 wt. % to about 50.0 wt. % of a drying oil soap comprising the combination of a metal hydroxide, a hydroxyamine, and a drying oil reacted to produce a drying oil soap. The use of the printing ink improves the removal of ink from the non-image areas of the intaglio cylinder and results in a printed substrate having good flexibility and good water resistance and minimizes or eliminates the need for volatile organic solvents.

Yet another aspect of the present invention is a method of intaglio printing using the previously mentioned intaglio printing inks.

The foregoing and other features and advantages of the present invention, will become more apparent from the following description.

BEST MODE FOR CARRYING OUT THE INVENTION

The drying oils useful in the practice in the present invention include chinawood oil, linseed oil, plukenetia oil, perilla oil, hemp-seed oil, and walnut oil and other drying oils conventional in the art. Drying oils typically are highly unsaturated oils which polymerize or cure by free radical polymerization. In addition to using drying oils, it is possible to use unsaturated fatty acids conventional in the art such as linoleic acid, linolenic acid, eleostearic acid, and polyethenoic acid. It is particularly preferred to use a chinawood oil such as Tung Oil brand manufactured by Alnor Oil Company, Valley Stream, N.Y.

The metal hydroxides useful in the practice of the present invention include potassium hydroxide, sodium hydroxide, lithium hydroxide, rubidium hydroxide and cesium hydroxide and the like in dry form or aqueous solution. It is particularly preferred to use a flaked potassium hydroxide manufactured by J. T. Baker, Phillipsburg, N.J.

The hydroxy amines useful in the practice of the present invention include triethanolamine, diethanolamine, monoethanolamine, tri-n-propanolamine, tri-isopropanolamine and amino methyl propanol. It is particularly preferred to use triethanolamine, in particular 85 percent triethanolamine manufactured by Ashland Chemical, Chicago, Ill.

The driers useful in the practice of the present invention are those conventional in this art and equivalents such as cobalt linoeate, manganese linoleate, cerium linoleate, lead linoleate, uranium linoleate, zinc linoleate and the like. A particularly preferred drier is Zinc-Calcium-Cobalt Printing Ink drier manufactured by Mooney Chemical, Cincinnati, Ohio.

The hydrocarbon solvents which may be used in the inks of the present invention include Magie Oil, Isopar, and other solvents conventional in this art such as mineral spirits, Varsol, Norpar, and Tridecanol.

The pigments which may be used in the inks of the present invention include, carbon black, iron oxide pigments, calcium carbonates, pthalocyanine pigments, azo pigments, and other organic pigments conventionally used in intaglio inks. Examples of pigments useful in the practice of the present invention include conventional pigments manufactured by BASF Corporation located in Holland, Mich., J. M. Huber Co., Quincy, Ill. and Pfizer Pigments Co., New York, N.Y.

The drying oil soaps of the present invention are formed by combining sufficient quantities of at least one drying oil, or optionally at least one unsaturated fatty acid, with sufficient quantities of at least one metal hydroxide and at least one hydroxy amine and heating these components at a sufficient temperature for a sufficient amount of time to produce a drying oil soap. The reaction is conducted in a suitable, conventional reactor vessel having a mixing means and a heating and cooling jacket. Typically, about 0.035 moles to about 0.713 moles of metal hydroxide is charged to the reactor vessel, more typically about 0.18 moles to about 0.36 moles and preferrably about 0.27 moles. Typically about 0.634 moles to about 1.076 moles of drying oil or unsaturated fatty acid is charged to the reactor vessel, more typically about 0.906 moles to about 1.019 moles and preferably about 0.962 moles. Typically about 0.335 moles to about 2.68 moles of hydroxy amine is charged to the reactor vessel, more typically about 0.805 moles to about 0.94 moles and preferably about 0.906 moles.

The components are typically mixed in the reactor vessel for about 60 minutes to about 360 minutes, more typically about 80 minutes to about 100 minutes and preferably about 90 minutes. The temperature of the components is controlled typically from about 140° C. to about 200° C., more typically about 170° C. to about 180° C. and preferably about 176° C.

The resulting drying oil soap product, or optionally fatty acid soap product, is removed from the reactor vessel and stored for further use. Although the metal hydroxide is believed to react with the drying oil to form a soap, it is believed that the hydroxy amine probably does not react with the drying oil although there is a slight probability of a very slight partial reaction. The hydroxy amine is believed to perform a stabilizing function by preventing micelles of the soap from agglomerating.

The Intaglio printing inks of the present invention incorporating the drying oil soap vehicles of the present invention are manufactured by initially mixing the following ingredients in a conventional mixing means such as a Cowles Mixer, manufactured by Jaygo, Inc., Mahwah, N.J., a Sigma mixer manufactured by Meyers Co., Bell, Calif., or a Versamixer, manufactured by Ross Co., Hauppauge, N.Y. Typically about 10.0 wt. % to about 60.0 wt. % of the drying oil soap of the present invention is incorporated into a printing ink, more typically about 15.0 wt. % to about 25.0 wt. % and preferably about 20.0 wt. %. The printing ink will typically comprise about 0.0 wt. % to about 5.0 wt. % of a drier, more typically about 1.0 wt. % to about 4.0 wt %, and preferably about 3.0 wt. %. The use of a drier is optional. The printing inks of the present invention will contain about 10.0 wt. % to about 80.0 wt. % of pigment, more typically about 35.0 wt. % to about 65.0 wt. % and preferably about 60.0 wt. %.

The printing inks of the present invention may be used without organic solvents, however, it is preferred to include sufficient amounts of organic solvents to provide optimum printing characteristics. The printing inks of the present inventions will typically comprise about 0 wt. % to about 15.0 wt. % of at least one organic solvent, more typically about 8.0 wt. % to about 12.0 wt. %, and preferably about 10.0 wt. %.

In addition to the previously mentioned ingredients, the printing inks of the present invention will optionally contain the following ingredients conventionally used in intaglio inks:

about 0.5 wt. % to about 4.0 wt. % of wax, about 0.1 wt. % to about 1.0 wt. % of antioxidant, and about 0.10 wt. % to about 5.0 wt. % of wetting agent. And, optionally, the printing inks may contain conventional amounts of the following ingredients conventionally used in intaglio inks:

water, toners, release aids, and resins.

The toners which may be used in the practice of the present invention include those conventional in the art such as carbon black, phthalo blue, pthalo green, lithol rubine and Red Lake C and the like.

The antioxidants which can be used in the printing inks of the present invention include those conventional in the art such as long chain alcohols including Ionol, Eugenol, and the like.

The wetting agents useful in the printing inks of the present invention include those conventional in this art such as aminomethyl propanol, Surfonyl, Tenlo 70, Triton X-100 and Aresol OT wetting agents and the like.

The waxes which may be used in the printing inks of the present invention include those waxes conventional in the art including polyethylene wax, teflon wax, natural waxes, wax blends, and the like.

The release aids which may be incorporated into the printing inks of the present invention include those conventional in the art such as amine waxes, silicones, hydroxy silicones, parafin waxes and the like.

The resins useful in the printing inks of the present invention include conventional resins such as urethane resins, rosin-ester resins, alkyd resins, phenolic resins, synthetic resins of various types and other resins conventional in the art.

Once the ingredients have been dispersed in one of the aforementioned mixing means, the mixture is typically further processed in a milling means. Typical milling means conventional in the art include shot mills, ball mills, flushers, and three roll mills. It is particularly preferred to manufacture intaglio inks using a three roll mill such as a New Cox brand 51" variable speed three roll mill manufactured by Burnett Brothers located in Anaheim, Calif. The inks are typically milled in a conventional manner until the ingredients have been homogeneously dispersed and the pigment particle size has been reduced to typically about 0.01 to about 20 microns, more typically 0.10 to about 5 microns and preferrably about 1.0 microns.

The ink is typically quality control tested using tests conventional in this art. The tests include color evaluation, chemical resistance, water resistance and flexibility.

The color evaluation test is typically performed by visual comparison of a substrate printed with the ink with a standard reference color. The color evaluation test can also be performed using conventional instrumentation such as a spectrophotometer.

Chemical resistance testing is conducted in accordance with the following test method. Drops of organic solvent are placed on the surface of a substrate printed with the ink and rubbed with a 200 gram steel weight with paper attached for 20 cycles with a Sutherland Rub tester. The results are compared visually.

Water resistance is tested using the following method. A substrate printed with the ink is soaked for 24 hours in a test solution comprising 1% sodium hydroxide in distilled water after which the surface is gently wiped, blotted and compared to the unsoaked print.

Flexibility testing is directed toward determining whether a printed image will remain intact on a substrate after the substrate is repeatedly flexed. The flexibility of a printed substrate is typically conducted in accordance with the following method. A 15 cm×60 cm sample is threaded through two (2) 0.32 cm diameter rollers attached to a clamp at one end and an 800 g weight at the other. The rollers are moved back and forth flexing the sample. Burst strength, stiffness, or gas permeation are checked after 1000 cycles (i.e. back and forth motions).

Water wiping of the intaglio inks of the present invention is tested by press performance. Water wiping and water resistance of the intaglio inks of the present invention are tested by printing performance, laundering tests, BEP Test Method RT-86-03 and other conventional tests. Flexibility of the printing inks of the present invention on a substrate is typically tested by National Bureau of Standard Flexing Test BEP Test Method RT-86-05.The disclosures of BEP Test Methods RT-86-01, RT-86-02,RT-86-03, RT-86-04, RT-86-05 and RT-86-06 are incorporated by reference.

The substrates upon which the Intaglio printing inks of the present invention may be printed include conventional substrates used in the printing art including parchment, glassine, vinyl, polypropylene, and currency paper. It is particularly preferred that the printing inks of the present invention be printed upon currency paper substrate comprising a high rag content cellulose matrix substrate such as that commercially available from Portals, Inc., 500 North Ridge Road, Atlanta, Ga.

The printing inks of the present invention may be used in conventional Intaglio printing processes using conventional Intaglio printing presses. The printing presses will comprise Intaglio presses such as Intaglio 8 brand manufactured by Giori, Lousanne, Switzerland and assembled by Koenig and Bauer, Wurzburg, Germany, Intaglio 331 brand manufactured by Komori America Corp., Rolling Meadows, Ill., 3 Color Web brand manufactured by Bobst Champlain, Inc., located in Roseland, N.J. and 6 Color Gravure brand manufactured by Androtti located in Ceprano, Italy. The printing presses useful in printing the Intaglio printing inks of the present invention typically and conventionally comprise at least one ink well, at least one ink roll, at least one Intaglio plate, and at least one wiping roll.

The intaglio plates which are useful in the practice of the present invention include conventional Intaglio plates containing indentations, spaces, voids, etchings, depression, cavities, etc. which form the image area of the plate and which carry ink for transfer to the substrate such as those available from Kalson Industries, Paterson, N.J. The intaglio plates can be made by etching, carving, engraving and other methods conventional in this art.

In a typical intaglio printing process, intaglio printing ink is contained in an ink well. At least one transfer roll transfers ink from the well to the depressed or sunken image areas of the intaglio cylinder under high pressure. Optionally, excess ink is then removed from the plate by an excess ink removal roll and the ink which is removed is recycled back to the ink well. Then the ink which adheres to the nonimage or planar areas of the Intaglio roll is wiped from the intaglio roll by at least one wiping roll. Ink is continuously removed from the wiping roll with a brush while applying a water solution. Next, the Intaglio roll, which is typically heated to about 150° F. to about 250° F. contacts a substrate under high pressure and ink is transferred from the image areas of the intaglio roll to the substrate thereby forming the printed image. The printed substrates are removed from the printing press and stacked to dry. The printed substrates printed by the process of the present invention using the water wipe intaglio inks of the present invention produce printed substrates having improved flexibility and improved resistance to wetting.

Although the drying oil soaps of the present invention are preferably used as vehicles in Intaglio printing inks, the use of these drying oil soaps in not limited thereto. The drying oil soaps of the present invention may also be incorporated into other types of printing inks such as gravure, flexographic, typographic, and serigraphic, printing inks. The drying oil soaps may also be useful in other types of products such as paints, varnishes, coatings, emulsions and caulks.

The following examples are illustrative of the principles and practice of this invention, although not limited thereto. Parts and percentages where used are parts and percentages by weight.

EXAMPLE 1

A drying oil soap useful as a vehicle in an intaglio printing ink composition was prepared by initially charging about 70.2 parts of Chinawood drying oil manufactured by Alnor Oil Company, about 8.8 parts of triethanolamine manufactured by Ashland Chemical Co., Columbus, Ohio and about 1.0 parts of potassium hydroxide manufactured by J. T. Baker, Philipsburg, N.J. into a conventional vessel having a suitable mixing means, and then mixing and heating the mixture to about 150° C. and maintaining the mixture at that temperature for about 2 to about 3 hours. When the reaction mixture contained in the mixing vessel was clear, about 20.0 parts of Pentalyn 856 brand rosin ester of pentaerythritol manufactured by Hercules Inc., Wilmington, Del. was added and the mixture was heated to about 150° C. and mixed until the reaction product was clear. Then the drying oil soap mixture was cooled to below 100° C. and discharged into a suitable container.

EXAMPLE 2

A water-wipe intaglio printing ink was prepared by mixing about 15.0 parts of the drying oil soap mixture of Example 1 with about 24.0 parts of iron oxide pigment manufactured by Pfizer, Inc., New York, N.Y. in a conventional vessel using a Cowles high speed mixer. The following ingredients conventionally used in intaglio printing inks were also incorporated into the intaglio printing ink:

1.0 parts of a manganese and cobalt drier manufactured by Mooney Chemical Co., Cincinnati, Ohio;
43.0 parts of barium sulfate pigment extender;
6.0 parts of Solvar brand alkyd varnish manufactured by Lawter Chemical. Co., Chicago, Ill.;
2.0 parts of Tung oil chinawood oil;
1.45 parts of Carbon Black Toner manufactured by Cabot Corp.;
1.5 parts of polyethylene wax;
0.20 parts of 2-AMP wetting agent;
3.00 parts of Varsol-18 hydrocarbon solvent; and,
0.05 parts of Eugenol antioxidant manufactured by Aldrich Chemical Co., Inc.

After the ink was mixed for a sufficient time to assure homogeneity, tne mixture was milled on a 52 inch three roll mill manufactured by Lehmann/Thropp Division of Paxson Machine Co., Salem, Ohio, to produce an ink having a maximum pigment particle size of about 1.0 microns.

The resulting printing ink was tested using conventional testing apparatus and procedures. The ink was tested in the laboratory for solvent wiping, flexibility, and water resistance.

The solvent wiping test was conducted in accordance with the following procedure.

A substrate comprising non-distinctive currency paper was printed with the ink by draw-down knife. When the ink was dry, 1 cc of a test solvent such as toluene was placed on the printed substrate and rubbed with a 200 gram steel member with paper attached for 20 cycles using a Sutherland rub tester, U.S. Pat. No. 1,734,375, manufactured by Sutherland Paper Co., Kalamazoo, Mich., by visual comparison. The test results were evaluated by visual comparison. The test results demonstrated similar (good) solvent resistance when compared to an acceptable standard.

The flexibility test was conducted in accordance with the following procedure.

A 15 cm by 60 cm sample of the printed substrate was threaded through two 0.32 cm rollers attached to a clamp at one end and an 800 gram weight at the other end. The rollers were cycled through a back and forth motion for at least 1,000 cycles. The bursting strength of the cycled sample was measured by a rubber diaphram burst tester. The stiffness was similar to a test standard tested after the 1,000 cycle flex test.

The gas permeation of the sample was measured by the pressure drop of one atmosphere of dry air through 1 square inch of a test sample in 1 minute at 25° C. The gas permeation was similar to an acceptable standard.

The water resistance test comprised a 24 hour soak test. The test was performed in accordance with the following procedure.

A substrate printed with the intaglio ink was soaked for 24 hours in a test solution comprising 1% sodium hydroxide in distilled water. Then the printed substrate was removed from the test solution, blotted and compared to another printed substrate (printed with the same ink). The soaked printed substrate demonstrated minimal loss of color.

The ink showed excellent solvent wiping resistance. The printed substrates demonstrated good flexibility and excellent resistance to water.

EXAMPLE 3

The Intaglio ink of Example 2 was printed on currency substrate using an I-8 brand printing press manufactured by Giori. The printing process used was a conventional water-wipe intaglio process. The ink of Example 2 was initially transferred to the press ink wells. At least one ink transfer roller transferred ink from the wells to at least one intaglio plate under high pressure. The plate was then wiped to remove excess ink with a hard vinyl excess ink roll. The excess ink was continuously removed from the excess ink roll by a doctor blade and recirculated to the ink wells. The inked plate was then wiped with a vinyl roll rotating in an opposite direction to the rotation of the plate thereby removing all ink from the non-image areas of the intaglio plate. The wiping roll was continuously washed clean of ink by the application of a Dalmar solution utilizing a brushing means. The Dalmar solution comprised about 1.0 wt. % sodium hydroxide, about 1.0 wt. % sulfonated castor oil and about 98.0 wt. % water. The roll was dried with an air stream.

The ink was transferred from the plate to the bank note paper substrate, which comprised a high rag and fiber content paper under high pressure, thereby forming printed images. The printed substrate was then removed from the press, stacked and dried.

The printed substrate was tested for durability in accordance with Bureau of Engraving and Printing Test Methods RT-86-01 through RT-86-06. The tests included laundering, flexing, tumble-soiling, chemical resistance, crumple test, abrasion, Fade-O-Meter, adhesion, boiling, humidity, and salt water solubility.

The printing ink demonstrated excellent wipeability as evidenced by the observation of virtually ink free water wiping rolls during the printing process. In addition, the printed substrates showed virtually perfect images indicating that no residual ink was left on the non-image areas of the plate prior to the contact of the plate with the substrate.

The printed substrates had excellent flexibility and excellent resistance to water. The printed substrates had excellent durability. It is estimated that VOC was reduced by 80% over a conventional solvent based ink.

The drying oil soaps of the present invention when incorporated into intaglio printing inks result in improved wipeability of intaglio plates in a water-wipe process and improved printed substrates. In addition, the printed substrate of the present invention surprisingly and unexpectedly demonstrates excellent flexibility and resistance to water. By using the intaglio inks of the present invention, it is now possible to eliminate or substantially reduce volatile organic content solvents from intaglio printing ink formulations thereby reducing harmful emissions to the environment and thereby protecting both the health of personnel involved in the printing of the substrates with intaglio inks as well as the surrounding community. In addition, the disposal of waste generated through the use of these intaglio inks is facilitated from an environmental perspective since flammable, ignitable, corrosive or hazardous volatile organic materials and solvents are minimized or eliminated.

Although this invention has been shown and described with respect to the detailed embodiments thereof, it will be understood by those skilled in the art that various changes in form and detail thereof may be made without departing from the spirit and scope of the claimed invention.

I claim:
1. An intaglio printing ink for use in intaglio printing, consisting of
   about 10.0 wt. % to about 80.0 wt. % pigment;
   about 0.0 wt. % to about 4.0 wt. % of a drying oil catalyst drier;
   about 0.0 wt. % to about 15.0 wt. % of at least one organic solvent; and
   about 15.0 wt. % to about 40.0 wt. % of the combination of a metal hydroxide, a hydroxy amine, and a drying oil reacted to produce a clear drying oil soap,
   wherein the ink when used in an intaglio printing process has improved water wiping and produces printed substrates having improved flexibility and resistance to water while minimizing or eliminating the need for volatile organic solvent.

2. The printing ink of claim 1 wherein the metal hydroxide is selected from the group consisting of potassium hydroxide, rubidium hydroxide, lithium hydroxide and cesium hydroxide.

3. The printing ink of claim 1 wherein the hydroxy amine is selected from the group consisting of triethanolamine, diethanolomine, monoethanolamine, tri-n-propanolamine, tri-isopropanolamine an aminomethyl propanol.

4. The printing ink of claim 1 wherein the drying oil is selected from the group consisting of chinawood oil, linseed oil, plukenetia oil, hempseed oil, perilla oil, and walnut oil.

5. The drying oil soaps of claim 1 wherein an unsaturated fatty acid is substituted for the drying oil to form a fatty acid soap.

* * * * *